May 1, 1934.　　　　C. M. GERE　　　　1,956,898
CHEESE MOLD
Filed Feb. 19, 1932
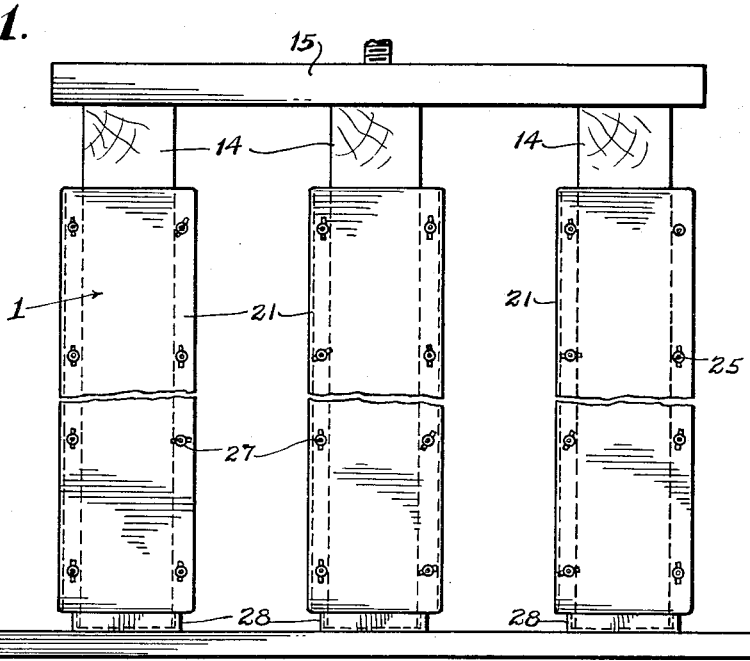
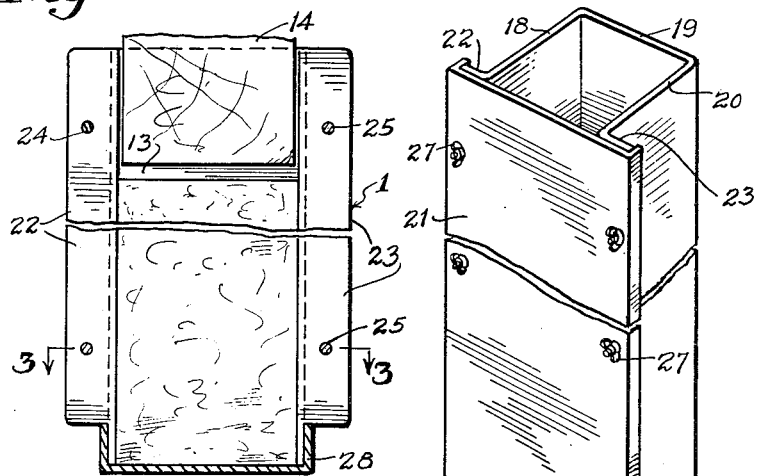
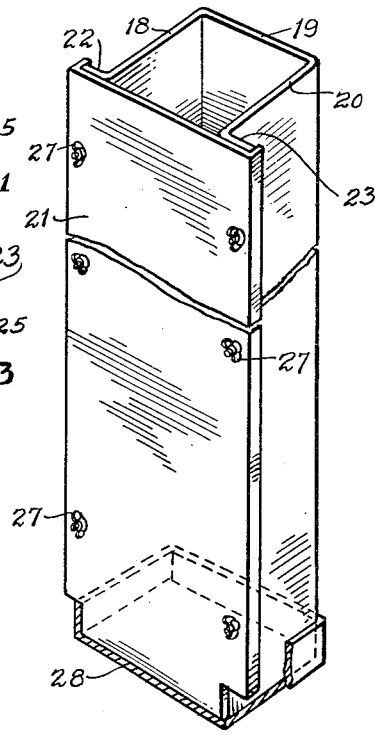
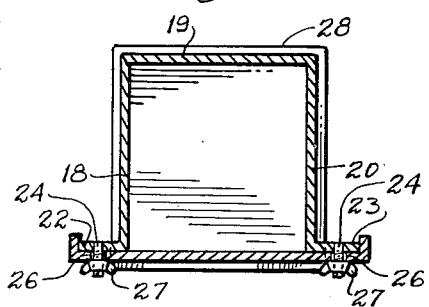
Inventor
CLAIR M. GERE
By Mason Fenwick & Lawrence
Attorneys Patented May 1, 1934

1,956,898

UNITED STATES PATENT OFFICE 1,956,898

CHEESE MOLD

Clair M. Gere, Green Bay, Wis., assignor to Natural Cheese Corporation, Dover, Del., a corporation of Delaware Application February 19, 1932, Serial No. 594,140

1 Claim. (Cl. 31—44)

This invention relates to cheese molds and the present application is a continuation-in-part of my co-pending application, Serial No. 520,685, filed March 6, 1931, now Patent No. 1,915,488, dated June 27, 1933.

The invention has for its object the provision of a mold for pressing bars of uncured cheese which are designed to be cut into blocks or units of exact weight and to be packaged in the uncured state so that the curing takes place in the final package.

Among the advantages of curing cheese in the package are the absence of rind, the prevention of shrinkage in bulk and loss of weight through drying out, and the prevention of mold growth. The securing of these advantages depends upon the nature of the package and the physical condition of the cheese. The package must be of such nature to exclude air to prevent dilution of the carbon dioxide generated in the fermentative reaction of the cheese in curing, and which carbon dioxide is relied upon to fill the interstitial spaces in the package and inhibit the growth of mold. The package must also be moisture-proof to prevent drying out of the cheese and its construction must be such as to relieve excess carbon dioxide pressure, to prevent bursting of the package.

The packaged unit or block of cheese must be shaped or molded so as to cooperate with a package having the qualities above described. The cheese must be free from superficial pits or fissures which might entrap and hold atmospheric air. Its surface must be smooth and its texture uniform so that the surfaces of the surrounding walls of the package may uniformly contact the surfaces of the cheese, whereby the exclusion of substantially all air is accomplished. Furthermore, since the packages will naturally be of uniform or standard capacity, the cheese blocks must be of exactly the same size, and since it is practically essential that for a given sized package the weights of the cheese blocks must be uniform, the density of the cheese must be such that blocks of equal volume will have exactly the same weight. This necessitates that the cheese blocks be cut from a molded bar or bars of uniform cross section.

The present invention is founded upon the necessity of all of these requisites and the mold in its several forms, comprising the subject matter of the present invention has for its general object the molding or pressing of cheese in such a manner that it may be removed from the mold in an uncured state without rind or bandage and that it be of even density and uniform cross section ready to be packaged in containers or packages of the same uniform cross section and in exact lengths to fill said packages and which exact lengths are of uniform weight.

Other objects of the invention will appear as the following description of several modified forms of cheese mold proceeds.

In the drawings which accompany and form a part of the specification, and in which the same characters of reference have been employed throughout the several figures to designate identical parts:

Figure 1 is a side elevation showing several identical molds in a press;

Figure 2 is a side elevation of a mold embodying the principles of the present invention.

Figure 3 is a cross section taken along the line 3—3 of Figure 2.

Figure 4 is a perspective view, part being broken away.

Referring now in detail to the several figures the numeral 1 represents in general a cheese mold consisting of a three-sided channel-shaped body member having the side walls 18 and 20 and the back wall 19, said body member being without bottom or top. The side walls 18 and 20 are formed with outwardly directed longitudinal flanges 22 and 23 lying in a common plane. The open side of the body member is closed by a removable plate 21 of sufficient width to embrace the flanges 22 and 23, said plate being secured to the flanges 22 and 23 by means of studs 24 fixed relative to the flanges 22 and 23 which pass through suitably located apertures in the plate 21 and carry wing nuts 27 by means of which the plate 21 is tightened against said flanges.

At the lower end of the body member the flanges 22 and 23 are cut away and the bottom portion of the plate 21 is correspondingly narrowed. The lower end of the receptacle formed by the channeled body member together with the plate 21 is received into a cup-shaped end piece 28. It is not necessary that the end piece 28 be provided with any securing means for as indicated in Figure 1, when pressure is applied to the contents of the mold the end piece 28 rests against a support which holds it in place.

In operation, a plurality of molds identical as to length and shape are filled with cheese curd from one vat. A metallic press plate 13 is placed on the top of the cheese mass in each mold. This press plate should fit the walls of the mold closely. A follower 14, preferably of wood is placed in contact with the press plate, and projecting from the top of the mold. The several molds are set under a press 15. It is obvious that the pressure will be uniform upon the contents of all of the molds and if the cheese is taken from the same vat and the molds are filled uniformly to begin with, the cheese will be uniformly densified as the pressure progresses so that, it having been determined just what length of block shall be cut off to equal the weight of the desired unit, equal lengths subsequently cut from the molded bars will have exactly the same weight.

After having been subjected to a preliminary pressing for about thirty minutes, or until such time as the free moisture is expelled, escaping between the flanges of the body member and the plate 21, and the curd is condensed together into a solid mass, the wing nuts 27 are loosened, and the piece 28 removed, and the mold having been laid flat, the plate 21 taken off and the body member bearing the bar of compressed cheese is then inverted on a piece of factory cloth or the like.

It will be understood that during this preliminary pressing no bandage has been used and that in the act of turning the cheese out of the mold it has been subjected to no strain, due to the novel construction of the mold, and in consequence, no bandage has been needed.

The texture of the surface of the cheese is, however, rough being not only of poor appearance but forming superficial insterstices through which residual air may be introduced into the final container. To provide a smooth surface for the cheese, it is now wrapped in the factory cloth upon which it was deposited and is now re-introduced into the mold, the mold re-assembled, and the cheese subjected to a further pressing which may continue for five or six hours. The mold is then removed from the press, taken apart, and the cheese removed. Since the factory cloth was not on the cheese in its initial pressing, it has not become irremovably embedded in the surface of the cheese as would have been the case had it been wrapped about the cheese during the entire pressing period, and is therefore, readily removed. The molded cheese is then cut transversely into sections of the desired length.

While I have in the above description disclosed several practical embodiments of the invention, it is to be understood that the invention can be exemplified in numerous other forms and that the specific details of construction as illustrated and described are merely illustrative and not to be construed as limiting the scope of the invention as claimed.

What I claim is:

A cheese mold comprising an integral elongated channeled member forming three sides of the mold and having outwardly extending flanges at its free edges, a plate constituting the fourth side of said mold and engaging said flanges, means co-acting with said plate and said flanges for securing said plate to said mold, said flanges terminating short of the lower end of said mold and said plate being correspondingly cut away at its lower end, and a cup-shaped cover fitting over the lower end of said mold below said flanges.

CLAIR M. GERE.